US 12,079,678 B2

(12) United States Patent
Baldischweiler

(10) Patent No.: US 12,079,678 B2
(45) Date of Patent: Sep. 3, 2024

(54) METHOD FOR PRODUCING A CARD BODY, CARD BODY FOR A CHIP CARD AND CHIP CARD

(71) Applicant: GIESECKE+DEVRIENT EPAYMENTS GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/267,508

(22) PCT Filed: Dec. 15, 2021

(86) PCT No.: PCT/EP2021/025501
§ 371 (c)(1),
(2) Date: Jun. 15, 2023

(87) PCT Pub. No.: WO2022/128159
PCT Pub. Date: Jun. 23, 2022

(65) Prior Publication Data
US 2024/0037363 A1 Feb. 1, 2024

(30) Foreign Application Priority Data
Dec. 18, 2020 (DE) ...................... 10 2020 007 784.6

(51) Int. Cl.
*G06K 19/063* (2006.01)
*G06K 19/04* (2006.01)
*G06K 19/077* (2006.01)

(52) U.S. Cl.
CPC ......... *G06K 19/063* (2013.01); *G06K 19/044* (2013.01); *G06K 19/07722* (2013.01)

(58) Field of Classification Search
CPC ............... G06K 19/063; G06K 19/044; G06K 19/07722
(Continued)

(56) References Cited

U.S. PATENT DOCUMENTS

| 2019/0156073 A1* | 5/2019 | Finn ...................... H05K 3/368 |
| 2020/0364527 A1* | 11/2020 | Coleman ............... G06K 19/063 |
| 2021/0150294 A1* | 5/2021 | Finn ...................... G06K 19/045 |

FOREIGN PATENT DOCUMENTS

EP 0817116 A2 1/1998

OTHER PUBLICATIONS

International Search Report from corresponding PCT Application No. PCT/EP2021/025501, Mar. 24, 2022.

(Continued)

*Primary Examiner* — Michael G Lee
*Assistant Examiner* — David Tardif
(74) *Attorney, Agent, or Firm* — Workman Nydegger

(57) ABSTRACT

A method for manufacturing a card body for a chip card, includes the steps of: supplying a metallic base body with two opposite main faces and a circumferential peripheral face connecting the two main faces, wherein in the base body a module opening for receiving a chip module has already been produced or will still be produced in a module opening zone, and producing a slot on the peripheral face between the two main faces. The slot is formed from the peripheral face up to the module opening or up to the module opening zone. An entry angle ($\alpha$) of the slot into at least one of the two main faces is not equal to ninety degrees with respect to the main face.

12 Claims, 4 Drawing Sheets

(58) Field of Classification Search
USPC .......................................................... 235/494
See application file for complete search history.

(56) References Cited

OTHER PUBLICATIONS

German Search Report from corresponding Application No. DE 102020007784.6, Jul. 21, 2021.

* cited by examiner

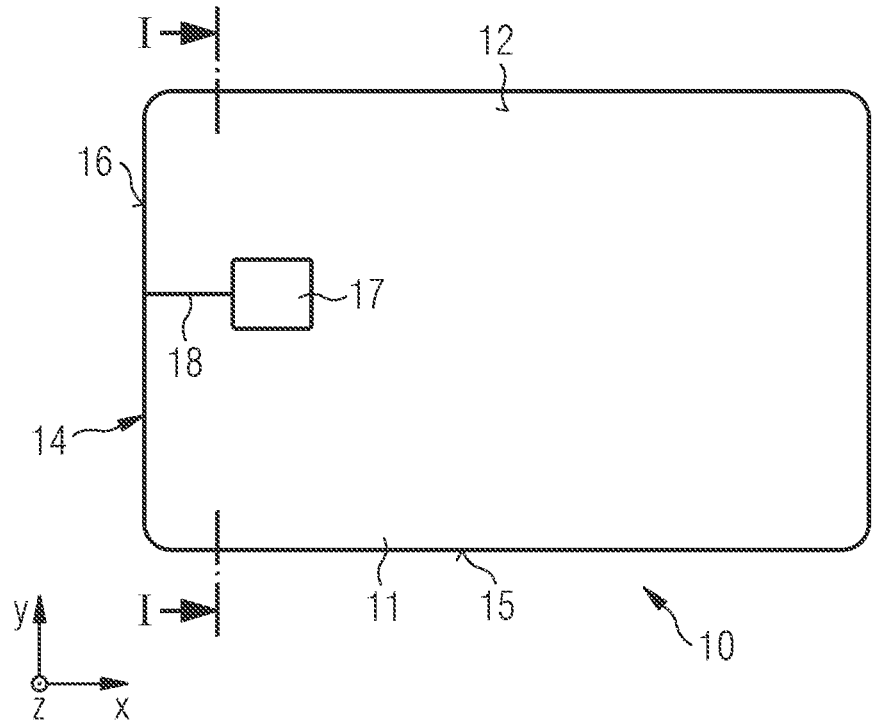
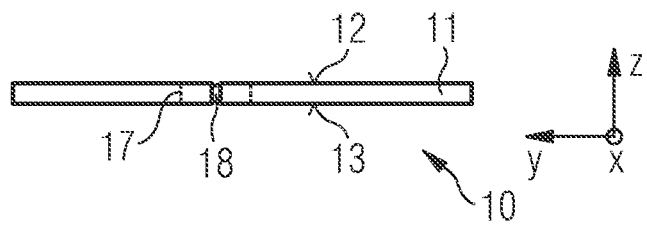
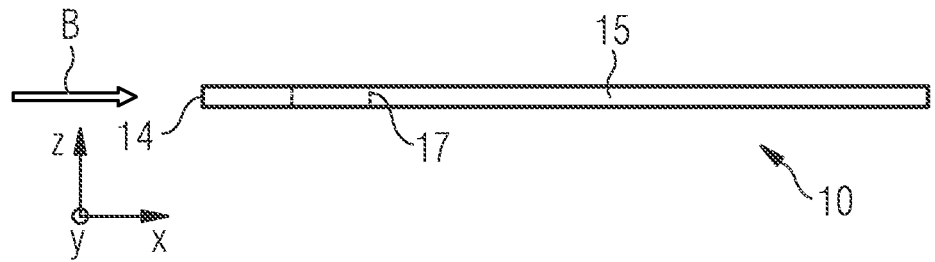

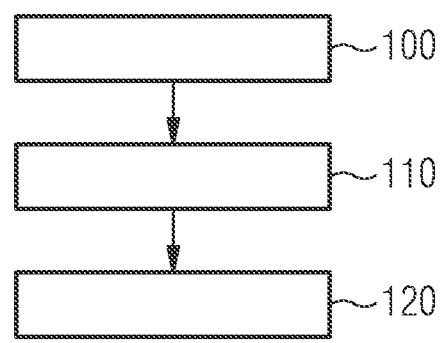

METHOD FOR PRODUCING A CARD BODY, CARD BODY FOR A CHIP CARD AND CHIP CARD

BACKGROUND

The invention relates to a method for manufacturing a card body for a chip card, a card body for a chip card and a chip card comprising a card body.

Card bodies with a metallic core in the form of a metallic core layer or a metallic core element are considered, as well as cards with dual interface (DI) functionality, where the card body consists partially or completely of metal. The energy coupling of DI systems with a two-coil system takes place through metal structures with a slot in which the magnetic flow/current flow is redirected in the metal faces. In this manner, the slot prevents short-circuit current.

The chip module is inserted into a cavity or module opening in the card body.

The mode of operation of such a card is that a chip module is employed that itself contains a coil (Coil On Module). This coil couples to the metallic card body. This coupling only works if the slot is present in the metal card body.

However, the slot causes the card to become unstable in this region. Since the cut extends to the module opening, damage can also occur to the module, for example due to shearing forces.

The fundamental disadvantage of the slot is not only the instability towards the module opening, but also the property that the plastic foils with which the metallic card cores are usually coated sag in the portion of the slot during lamination. This leads to an impaired visual appearance.

SUMMARY

The variant of card manufacture in which the metal layer is not covered with plastic foils, but merely covered with a protective lacquer, allows the slot to be clearly recognized, so that the visual appearance is impaired.

The object of the present invention is therefore to improve the stability of the card body and of the chip card in the portion of the slot.

This object is achieved by a method for manufacturing a card body for a chip card, a card body for a chip card and a chip card comprising a card body.

A method according to the invention for manufacturing a card body for a chip card comprises the steps of:
supplying a metallic base body with two opposite main faces and a circumferential peripheral face connecting the two main faces, wherein a module opening for receiving a chip module has already been produced in the base body or is will still be produced in a module opening zone, and
producing a slot on the peripheral face between the two main faces, wherein the slot is formed from the peripheral face to the module opening or to the module opening zone, and wherein an entry angle of the slot into at least one of the two main faces is not equal to ninety degrees with respect to the main face.

A basic idea of the present invention is that the slot in the metallic base body is no longer formed perpendicularly to the main face, but at an angle that differs from 90°. In other words, the slot or at least an entry portion of the slot on the main face extends obliquely to the main face. This results in an overlap of portions of the metallic base body separated by the slot, said overlap being in a direction perpendicular to the main faces. This overlap means that a shearing movement can be inhibited at least in one direction.

With the slot proposed here, on the one hand, the card body is stabilized with regard to shearing. In addition, there results the advantage that the cover foils, for example made of plastic, can no longer sag so much into the portion of the slot, since the oblique entry of the slot offers such a foil support. In addition, the slot can now be filled with an adhesive or another material, since the obliquely extending slot prevents or at least significantly reduces the leaking out of the adhesive or the material.

The slot proposed here thus has the advantage that the oblique execution of the slot improves the mechanical or structural stability of the card body and also prevents or at least significantly improves sagging of the foil into the slot. Another advantage is that with this processing from the front face, fewer chips from cutting the card out of the solid material and from introducing the module opening can accumulate in the slot.

The angle of the slot to the main face is understood here as the entry angle of the slot into the metal base body. This angle can also be referred to as the exit angle, since this angle is not subject to any functionality with regard to entry or exit.

When producing the slot, it can be provided that the main axis of the tool with which the slot is produced is aligned parallel to the main faces and the slot is produced starting at the peripheral face towards and up to the module opening (or to the corresponding zone for the module opening). For example, a milling cutter or laser can work or be aligned perpendicularly to the peripheral face to create the slot and work its way into the metal base body from the peripheral face.

It can be provided for the slot to be shaped by a toothed cut which provides an overlap between two opposite walls of the slot. A toothed cut is understood to mean a cut in which one or several such overlaps are present along the profile of the slot. This overlap or these overlaps prevent shearing or bending of the card body in one or several directions. The two main directions in which shearing or bending is to be prevented are the two normal vectors onto the two main faces. One or several toothings in the cut are achieved by changing direction when creating the cut. This means that when a milling cutter or laser is aligned perpendicularly to the peripheral face to create the slot, then it can be gradually shifted from one main face to the other main face while maintaining alignment and thereby going through the changes in direction in order to produce the toothing or toothings.

It can further be provided for the slot to be cut with a laser and for the focus of the laser preferably to be readjusted as the cutting depth increases. In this manner, the focus of the laser can always be on the cutting point and optimal material removal can take place. Instead of a laser, for example, water jet cutting or a milling machine can also be employed.

It can be provided that at least one portion of the slot is formed in an arched shape, so that a first wall of the slot has a concave portion and an opposite second wall of the slot has a convex portion, wherein the convex portion engages in the concave portion. It is also possible to form several concave portions and corresponding convex portions along the slot from one main face to the second main face. With such a curved profile of the slot it is possible to effectively inhibit or limit shearing of the card body and thus of the chip card in both main directions. In particular, creating the slot in a round or arched shape minimizes the formation of burrs in the slot.

It can further be provided for a change of direction to take place during the production of the slot in such a manner that the slot between the two main faces is formed in a wedge shape. As mentioned, with a wedge shape of the slot, shearing of the card body and thus of the chip card in both main directions can be effectively inhibited or limited. During the creation of the slot, the change of direction, for example of a laser, can then take place at the point of the wedge tip.

It can be provided for a respective plastic layer to be applied to the main faces by means of an adhesive, wherein the slot is at least partially filled with the adhesive. For example, the plastic layers can already be covered with the adhesive when they are applied to the main faces. The still liquid or viscous adhesive then runs into the obliquely formed slot. Due to the obliqueness and/or one or several changes in direction of the slot, the adhesive remains in the slot and does not leak out. The adhesive that then cures holds the walls of the slot in position, thereby further impeding or inhibiting warping or shearing of the card body and thus of the chip card. In addition, the risk of a short circuit can be further reduced since contacting of the walls of the slot is prevented by the adhesive.

It can further be provided for the module opening to be produced only after the plastic layers have been applied. The production of the slot proposed here can thus be used in various phases of the manufacture of a card body or a chip card.

A card body according to the invention for a chip card comprises
- a metallic base body with two opposite main faces and a circumferential peripheral face connecting the two main faces, wherein a module opening for receiving a chip module has already been produced in the base body or will still be produced in a module opening zone, and
- a slot which extends from the peripheral face of the base body up to the module opening or up to the module opening zone and which extends between the two main faces,
- wherein an entry angle of the slot into at least one main face is not equal to 90° with respect to the main face.

The same advantages and modifications as previously described apply.

The module opening is formed as a through opening or as a blind hole in one of the main faces of the metallic base body or the card body. When the slot is created, either the module opening or the corresponding module opening zone in which the module opening will later be formed is present.

It can be provided for the entry angle to be less than or equal to 82°, preferably between 30° and 60°, and most preferably 45°. It has been shown that such angles, depending on the thickness of the metallic base body and the slot width, offer good coverage of the portions of the metallic base body separated by the slot. For example, with a base body thickness of 500 µm and a cutting width and thus slot width of 50 µm, good coverage of the portions separated by the slot begins at an angle of approximately 80° to 82°. This means that the portions of the metallic base body separated by the slot "overlap" one another in part when one looks perpendicularly onto one of the main faces.

It can further be provided that the slot is shaped by a toothed cut which provides an overlap between two opposite walls of the slot. A toothed cut is understood here to mean a cut in which one or several such overlaps are present along the profile of the slot. This overlap or these overlaps prevent shearing or bending of the card body in one or several directions. The two main directions in which shearing or bending is to be prevented are the two normal vectors onto the two main faces.

It can be provided for a first wall of the slot to have a concave portion and for an opposite second wall of the slot to have a convex portion, wherein the convex portion engages in the concave portion. The concave and convex profile of the wall faces in the direction from one main face to the other main face is considered here. It is also possible to form several concave portions and corresponding convex portions along the slot from one main face to the second main face. With such a curved profile of the slot between the two main faces, shearing of the card body and thus of the chip card in both main directions can be effectively inhibited or limited.

It can further be provided that the slot between the two main faces is formed in a wedge shape. With a wedge shape of the slot, shearing of the card body and thus of the chip card in both main directions can be effectively inhibited or limited. One side of the wedge in each case prevents shearing movement in one of the two main directions. A symmetrical wedge cut can be provided, in which a wedge tip of the slot lies in a central plane of the card body and both legs have the same entry angle. Further, an asymmetrical wedge cut can be provided, in which the lengths and also the entry angles of the two legs of the wedge-shaped slot are different.

It can be provided that one or two undercuts are provided in the region of a wedge tip of the slot. These undercuts can be formed, for example, by extensions of the legs of the wedge-shaped slot beyond the point of intersection of the two legs, thus beyond the tip of the wedge. An advantage of this undercut is that the walls of the slot can have fewer burrs at the point of intersection or crossing point of the two legs. In this manner, the risk of short circuits caused by a contact of the opposite walls of the slot can be prevented. At the same time, the blind hole of the undercut can serve as a depot for chips that occur during manufacture.

A chip card according to the invention comprises a card body as previously described and a chip module which is at least partially embedded in the module opening of the card body. The same advantages and modifications as previously described apply. The card body comprises a metallic base body and can be formed with or without plastic cover layers.

BRIEF DESCRIPTION OF THE DRAWINGS

The present invention will hereinafter be described by way of example with reference to the attached drawings. Therein are shown:

FIG. 1: a plan view of a card body for a chip card;

FIG. 2: a sectional representation of the card body according to FIG. 1 along the line I-I;

FIG. 3: a view of an end face of the card body from FIG. 1;

FIG. 11: a schematic representation of a method for manufacturing a card body.

DETAILED DESCRIPTION OF VARIOUS EMBODIMENTS

Figure 4:
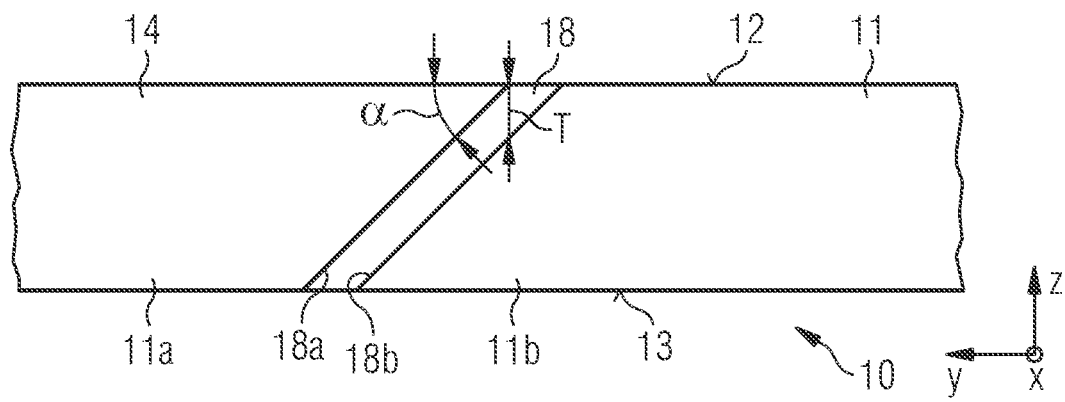
FIG. 4: a partial view of an end face of a card body with a slot according to a first embodiment example.

FIG. 1 shows a card body 10 for a chip card. The card body 10 has a metallic base body 11 with two opposite main faces, of which one main face 12 is visible in FIG. The other opposite main face 13 is represented in FIG. The two main faces 12, 13 extend parallel to one another and are connected by a circumferential peripheral face 14. The metallic base body 11 can be present, for example, in the form of a core or a layer made of a high-grade steel alloy, for example with a thickness of 400 μm. The thickness of the base body 11 can be between 50 μm and 920 μm, for example.

The metallic base body 11 has a rectangular shape in an x-y plane, in which the peripheral face 14 lies with two longitudinal faces 15 extending in the x-direction and two end faces 16 extending in the y-direction. The thickness of the base body 11 extends in the z-direction.

A module opening 17 for a chip module is recessed in the main face 12 of the card body 10. The module opening 17 extends here through the entire metallic base body 11, but can also be formed as a blind hole opening. It can also be produced later. The module opening 17 is created, for example, by means of a laser operation or a milling operation.

A slot 18 is provided in the metal base body 11 and extends from the peripheral face 14 or, in other words, from an outer edge of the metal base body 11 to the module opening 17. The slot 18 thus connects the module opening 17 with the peripheral face 14. The slot 18 extends in the y-direction, i.e. parallel to the longitudinal face 15. The slot 18 has, for example, a width between 30 μm and 100 μm, preferably between 50 μm and 80 μm.

In FIG. 1 the slot 18 is represented on a left side. The slot 18 can also be arranged on a right, upper or lower side of the base body 11. The slot 18 serves to avoid short-circuit currents or eddy currents.

FIG. 2 shows a sectional representation of the card body 10 according to the line I-I of FIG. 1. It can be recognized that the slot 18 completely severs the base body 11 in thickness or height, i.e. in the z-direction. The slot 18 thus connects the two main faces 12, 13. The slot 18 extends in the y-direction up to the module opening 17.

FIG. 3 shows a view of the longitudinal face 15 of the card body 10. In this case, the card body 10 or the metallic base body 11 is present in an already cut out state. The module opening 17 has also already been recessed in the base body 11, while the slot has not yet been formed. The slot is formed in the metallic base body 11 for example by laser cutting, water cutting or milling. This takes place in a processing direction B from the peripheral face 14, here from the end face 16, of the card body 10 or of the metal base body 11. The forming of the slot takes place up to the wall of the module opening 17, so that the slot and the module opening 17 communicate with one another or are connected.

FIG. 4 shows a partial view of the end face 16 of the card body 11 or the metallic base body 11 with a slot 18. An entry angle α of the slot 18 is not equal to 90° with respect to the main face 12 and analogously with respect to the main face 13.

In FIG. 4, the slot 18 is continuously executed at a 45° angle. The entry angle α can be chosen to be less than or equal to 85° or between 30° and 60°, for example. Depending on the chosen side or wall of the slot 18, the entry angle α can be 45° or, as a corresponding supplementary angle, 135°.

The slot 18 is shaped by a toothed cut that provides an overlap or coverage between two opposite walls 18a and 18b of the slot 18. This overlap or coverage is in the direction of a surface normal to the main face 12 or, put differently, in the direction of the thickness or height of the card body 10 or base body 11. In the figures, this is the z-direction. The two walls 18a, 18b can extend parallel.

The angles specified above allow sufficient overlap or coverage for the usual thicknesses of the card bodies of, for example, between 50 μm and 920 μm, and the usual cutting widths between 40 μm and 80 μm.

In the example represented in FIG. 4, the thickness or height of the card body 10 or of the metallic base body is 11 400 μm. With the entry angle α of 45°, a visible depth T is about 110 μm. The visible depth T is the distance of the wall 18b from the main face 12, as viewed perpendicularly or in the direction of the surface normal of main face 12 at the entry point of the wall 18a. This visible depth T can be seen, for example, as a measure of an overlap or coverage.

The slot 18 with its walls 18a and 18b divides the base body 11 into two portions 11a and 11b, wherein the portion 11a lies on the side of the wall 18a and is delimited thereby. Analogously, the portion 11b is on the side of the wall 18b and is delimited thereby.

In the portion of the slot 18 there is thus an overlap or coverage of the two walls 18a and 18b and thus of the two portions 11a and 11b. This overlap or coverage is present in the direction of the surface normal of the main face 12. In the case of a cut, also a virtual one, in the direction of the surface normal through the base body 11, there is thus always a point of intersection with the two walls 18a and 18b and thus with the two portions 11a and 11b.

The overlap or coverage of the two walls 18a and 18b or of the two portions 11a and 11b now blocks the displacement of the portion 11a over the portion 11b. This corresponds to a pressure movement on the portion 11b in the z-direction, i.e. a movement of the two walls 18a and 18b towards one another. The portion 11b can only move a small distance, which corresponds approximately to the visible depth T. Then it abuts on the portion 11a and is stopped thereby. Thus, the obliquely formed slot 18 can prevent an undesired shearing movement of the card body 10 or of the base body 11.

On the other hand, when the portion 11b is moved away from the portion 11a, which in FIG. 4 corresponds to a movement downwards in the negative z-direction, no blocking takes place.

The above considerations of the movement of the portion 11b apply analogously to the portion 11a, only with a correspondingly reverse movement.

Figure 5:
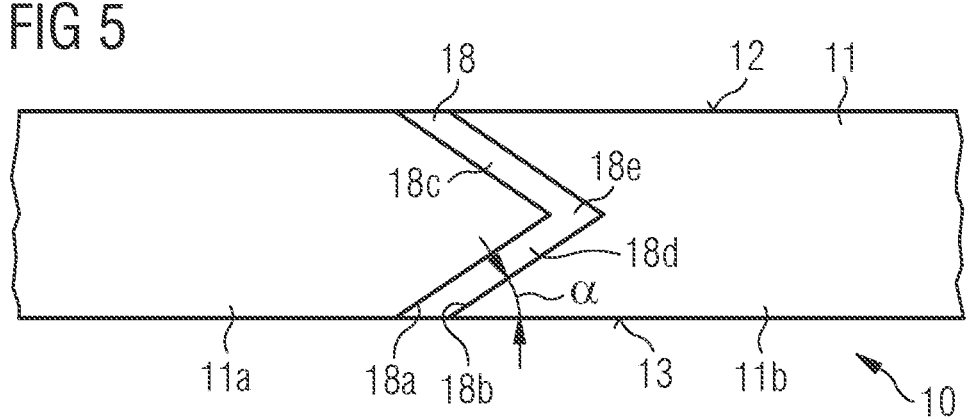
FIG. 5: a partial view of an end face of a card body with a slot according to a second embodiment example.

FIG. 5 shows a partial view of the end face 16 of the card body 10 with a slot 18 which is formed in a wedge shape between the two main faces 12 and 13.

As in FIG. 4, the entry angle α is 45°. In contrast to FIG. 4, the slot 18 is not formed in a straight line in cross section, but as a symmetrical wedge cut with two legs 18c and 18d, both of which have the same entry angle α. A wedge tip 18e of the slot 18 lies in a central plane of the card body 10 or the base body 11. Apart from that, the specifications according to FIG. 4 also apply to the card body 10 or base body 11 illustrated in FIG. 5.

In contrast to the card body 10 represented in FIG. 4, here in the portion of the slot 18 there exists a double overlap or coverage of the two walls 18a and 18b or of the two portions 11a and 11b.

In the case of a cut, also a virtual one, in the direction of the surface normal through the base body 11, there are thus two points of intersection with the two walls 18a and 18b, at least in sections.

This double overlap or coverage, so to speak, of the two walls 18a and 18b or of the two portions 11a and 11b now blocks the displacement of the two portions 11a and 11b in both directions. Thus, the wedge-shaped slot 18 can prevent an undesired shearing movement of the card body 10 or the base body 11 in both directions. The term both directions means in the direction of both surface normals of the main faces 12 and 13.

Figure 6:
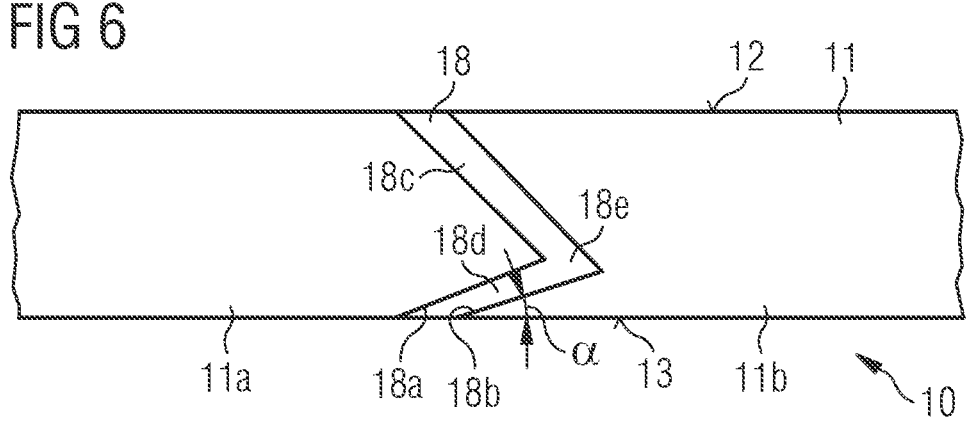
FIG. 6: a partial view of an end face of a card body with a slot according to a third embodiment example.

FIG. 6 shows a partial view of the end face 16 of the card body 10 with a slot 18 which is formed as an asymmetrical wedge cut.

As in FIG. 5, the slot 18 is formed in a wedge shape, but as an asymmetrical wedge cut with two legs 18c and 18d, in which the lengths and also the entry angles α of the two legs 18c and 18d of the wedge-shaped slot 18 are different. The wedge tip 18e of the slot 18 is off-center in the card body 10 or base body 11. Therefore, reference is generally made to the description of FIGS. 4 and 5 above.

Here too there exists a double overlap or coverage of the two walls 18a and 18b or of the two portions 11a and 11b in the portion of the slot 18. In the case of a cut, also a virtual one, in the direction of the surface normal through the base body 11, there are thus two points of intersection with the two walls 18a and 18b, at least in sections.

This double overlap or coverage, so to speak, of the two walls 18a and 18b or the two portions 11a and 11b blocks the displacement of the two portions 11a and 11b in both directions. Thus, the wedge-shaped slot 18 can prevent an undesired shearing movement of the card body 10 or of the base body 11 in both directions. The term both directions means in the direction of both surface normals of both main faces 12 and 13.

Figure 7:
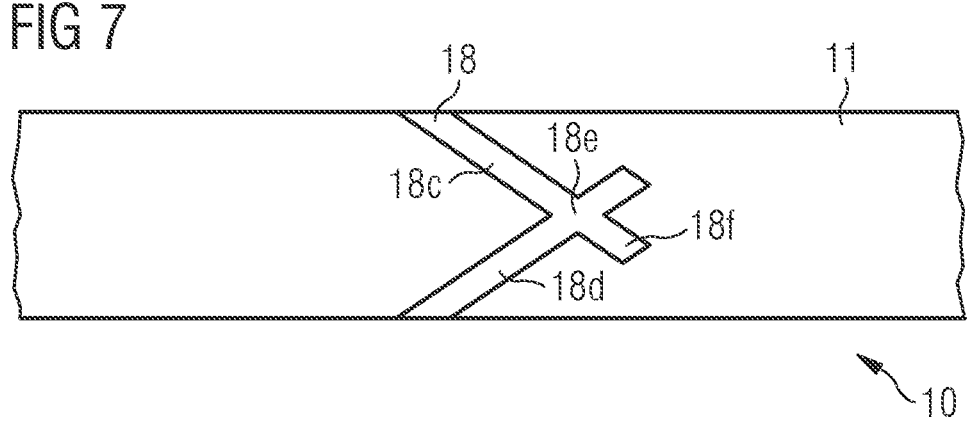
FIG. 7: a partial view of an end face of a card body with a slot according to a fourth embodiment example.

FIG. 7 shows a partial view of the end face 16 of the card body 10 with a slot 18 in which an undercut 18f is provided in the region of the wedge tip 18e of the slot 18 for both legs 18c and 18d.

Except for the two undercuts 18f, the slot 18 or the card body 10 or base body 11 is identical to the slot 18 or card body 10 or base body 11 represented in FIG. 5. Therefore, reference is generally made to the above description of FIGS. 4 to 6 to avoid repetitions. The two undercuts 18f can also be provided with an asymmetrical slot.

These undercuts 18f can be formed, for example, by extensions of the legs 18c, 18d of the wedge-shaped slot 18 beyond the point of intersection 18f of the two legs 18c, 18d. The length or depth of the undercuts 18f can correspond to the cutting width of the slot 18, for example. It is likewise possible for the undercut 18f of one leg to be formed so short that it just penetrates the other leg or its wall.

Figure 8:
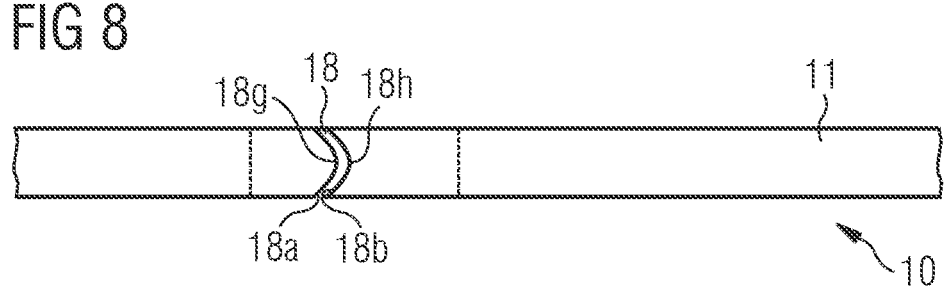
FIG. 8: a partial view of an end face of a card body with a slot according to a fifth embodiment example.

FIG. 8 shows a partial view of the end face 16 of the card body 10 with a slot 18 which is formed in an arched shape or, put differently, has a curved profile from the main face 12 to the main face 13.

One wall 18a of the arched slot 18 has a convex portion 18g and an opposite wall 18b of the slot 18 has a concave portion 18h, wherein the convex portion 18g engages the concave portion 18h. The two portions 18g and 18h can be coordinated in such a manner that they extend parallel to one another. This can be easily implemented using a tool the width of the slot 18.

The convex portion 18g and the concave portion 18h can occupy part or all of the respective wall 18a or 18b.

The further details, for example with regard to the entry angle or the overlap, correspond to those for FIGS. 4 to 6. For example, the arched slot 18 thus can also be formed asymmetrically.

9 shows a partial view of the end face 16 of the card body 10 with a slot 18 with two convex and concave portions 18g and 18h. Correspondingly, the statements regarding FIG. 8 also apply to the card body 10 according to FIG. 9 in general.

Figure 9:
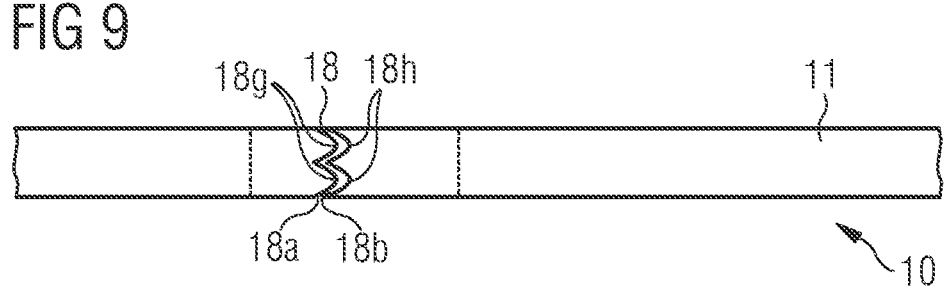
FIG. 9: a partial view of an end face of a card body with a slot according to a sixth embodiment example.

The card body 10 or base body 11 according to FIG. 9 has two adjacent convex portions 18g along the wall 18a and two adjacent concave portions 18h along the wall 18b, wherein the respective portions engage with one another.

The two convex portions 18g and the two concave portions 18h can directly adjoin each other. It is likewise possible for a neutral portion, for example in the form of a straight line, to be provided between two respective portions.

Figure 10:
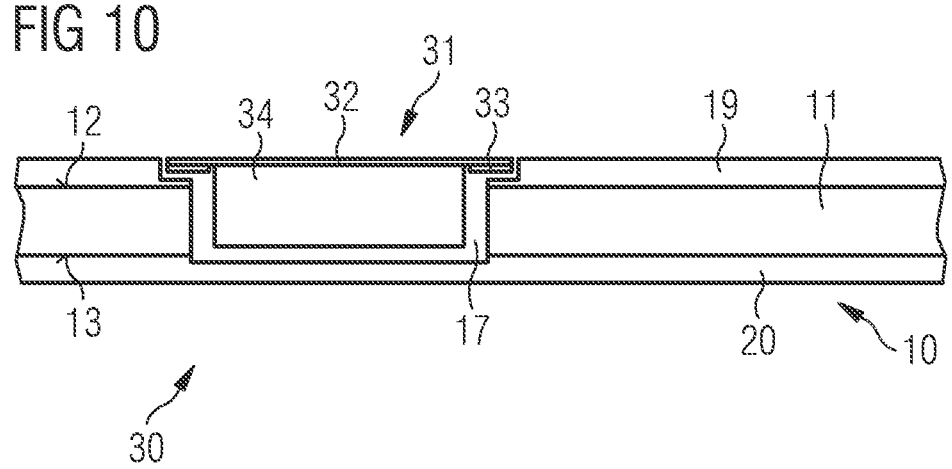
FIG. 10: a sectional representation of a chip card with card body and chip module.

FIG. 10 shows a sectional view of a chip card 30 with a card body 10 as previously described and a chip module 31.

The card body 10 comprises the base body 11, for example in the form of a metallic layer in the form of a core or a layer made of a high-grade steel alloy with a thickness of 400 μm.

A main face 12 or surface of the base body 11 is covered or laminated with a plastic layer 19. An opposite second main face 13 or surface of the base body 11 is covered or laminated with a further plastic layer 20. The two plastic layers 19, 20 can be composed of PVC, PET, PE, PET-G, PLA or PC, for example. The thickness of the entire card body 10 should not exceed the maximum thickness of a chip card body according to ISO 7810. Typically, the thickness of the plastic foils is 180 μm in each case with a thickness of the metal layer of 400 μm, resulting in a total thickness of the chip card body of 760 μm.

The module opening 17 is recessed in the main face or surface of the card body 10. The module opening 17 extends through the entire plastic layer 19, the entire metallic base body 11 and part of the plastic layer 20. The module opening 17 is created, for example, by means of a laser operation or a milling operation.

The chip module 31 is arranged in the module opening 17 and adhesively bonded there, for example. The chip module 31 includes a contact area structure 32 which carries a coil 33. The contact area structure 32 rests on the plastic layer 19 in an outer region of the module opening 17.

The chip module 31 further comprises a chip 34 which is attached, for example, in a casting compound on a lower side of the contact face structure 32. The chip 34 is supplied with energy and/or signals via the coil 33. In this manner, an electromagnetic field exiting from the metallic base body 11 can be coupled into the coil 33.

FIG. 11 shows a schematic representation of a method for manufacturing a card body 10 as previously described.

In a first step 100 of the method for manufacturing a card body 10 for a chip card 30, a supplying takes place of the metallic base body 11 with two opposite main faces 12, 13 and a circumferential peripheral face 14 connecting the two main faces 12, 13. A module opening connecting the two main faces 12, 13 can already be provided in the main faces 12, 13 or can also be provided later.

In a second step 110 of the method, a production takes place of the slot 18 on the peripheral face 14 between the two main faces 12, 13, wherein the slot 18 is formed from the peripheral face 14 to the module opening 17. Should the module opening 17 be manufactured in a later fabrication step, the slot is produced up to the corresponding module opening zone where the module opening is to be formed later.

The tool for creating the slot 18 is aimed at the peripheral face 14, ideally perpendicularly onto the peripheral face 14. For this purpose, the main axis of the tool with which the slot 18 is produced is aligned parallel to the main faces 12, 13, and the slot is produced starting at the peripheral face 14 towards and up to the module opening 17 or to the corresponding zone.

The slot 18 is formed in such a manner that an entry angle α of the slot 18 at least into one main face 12 is not equal to ninety degrees with respect to the main face 12. The slot 18 is executed completely between the two main faces 12, 13 so that they are connected by the slot 18.

Optionally, for example when the slot 18 is cut with a laser, a focus of the tool or the laser is readjusted as the cutting depth increases. In this manner, the material removal can always take place at an optimal working point. The forming of the slot 18 then takes place in stages or continuously. A formation at full depth can also take place at the respective processing point.

The card bodies 10 or base bodies 11 represented in FIGS. 4 to 9 are formed according to the above method. Details on the manufacture of the respective card bodies 10 or base bodies 11 are described in the following.

For the card body 10 or base body 11 according to FIG. 4, a straight cut is made at an entry angle α of the slot 18 into a main face 12 up to the opposite main face 13.

For the card body 10 or base body 11 according to FIGS. 5 and 6, the start takes place as for FIG. 4, until a change in direction of the tool is made in a region of the wedge tip 18*e* to be produced, so that the wedge shape results. For example, a cutting or milling operation begins on leg 18*c* at an angle of 45° to the main face 12. The cut is made in a straight line up to the wedge tip 18*e*. There, the movement path of the tool is rotated by an angle, for example 90°, in order to then form the leg 18*d*.

For the card body 10 or base body 11 according to FIG. 7, undercuts 18*f* are formed, for example by extensions of the legs 18*c*, 18*d* of the wedge-shaped slot 18 beyond the point of intersection 18*f* of the two legs 18*c*, 18*d*. For this purpose, the tool moves beyond the wedge tip 18*e*, with the direction remaining unchanged, until the undercut 18*f* is formed. For the second leg the same procedure takes place.

For the card body 10 or base body 11 according to FIGS. 8 and 9, one or several convex portions 18*g* along the wall 18*a* and one or several concave portions 18*h* along the wall 18*b* are formed by a suitable tool path, wherein the respective convex and concave portions engage with one another.

In order to form these convex and concave portions, the tool is moved over the peripheral face 14 in a curved line. Combinations of convex and concave portions are possible. These portions are intended to engage with one another or, put differently, are intended to overlap in order to avoid shearing movements of the card body 10.

In an optional third step 120 of the method, a respective plastic layer 19, 20 is applied to the main faces 12, 13 by means of an adhesive, wherein the slot 18 is at least partially filled with the adhesive. The inner contour of the slot 18 at least partially prevents the adhesive from leaking out, so that it remains in the slot 18. The card body 10 or the chip card 30 is further stabilized by the adhesive which cures in the slot. If the module opening 17 in the card body 10 is not manufactured until after the plastic layers have been applied, the adhesive that has flowed into the slot 18 and dried or cured there prevents chips produced in the production of the module opening 17 from getting stuck in the slot 18 and causing an electrical short circuit there.

The invention claimed is:

1. A method for manufacturing a card body for a chip card with the steps of:
   supplying a metallic base body with two opposite main faces and a circumferential peripheral face connecting the two main faces,
   wherein in the base body a module opening for receiving a chip module has already been produced or will still be produced in a module opening zone, and
   producing a slot on the peripheral face between the two main faces,
   wherein the slot is formed from the peripheral face up to the module opening or up to the module opening zone, and
   wherein an entry angle of the slot into at least one of the two main faces is not equal to ninety degrees with respect to the main face,
   wherein at least a portion of the slot is formed in an arched shape from one main side to the other main side so that a first wall of the slot has a concave portion and an opposite second wall of the slot has a convex portion,
   wherein the convex portion engages in the concave portion.

2. The method for manufacturing a card body according to claim 1, wherein the slot is shaped by a toothed cut providing an overlap between two opposite walls of the slot.

3. The method for manufacturing a card body according to claim 1, wherein the slot is cut with a laser and that the focus of the laser is readjusted as the cutting depth increases.

4. The method for manufacturing a card body according to claim 1, wherein a change of direction is made when producing the slot, so that the slot between the two main faces is formed in a wedge shape.

5. The method for manufacturing a card body according to claim 1,
   wherein a respective plastic layer is applied to the main faces by means of an adhesive,
   wherein the slot is at least partially filled with the adhesive.

6. The method for manufacturing a card body according to claim 5, wherein the module opening is only produced after the plastic layers have been applied.

7. A card body for a chip card, having:
   a metallic base body with two opposite main faces and a circumferential peripheral face connecting the two main faces,
   wherein in the base body a module opening for receiving a chip module has already been produced or will still be produced in a module opening zone, and
   a slot which extends from the peripheral face of the base body to the module opening or to the module opening zone and which extends between the two main faces,
   wherein an entry angle of the slot into at least one main face is not equal to 90° with respect to the main face,
   wherein a first wall of the slot has a concave portion and that an opposite second wall of the slot has a convex portion,
   wherein the convex portion engages in the concave portion.

8. The card body according to claim 7, wherein the entry angle is less than or equal to 82°.

9. The card body according to claim 7, wherein the slot is shaped by a toothed cut providing an overlap between two opposite walls of the slot.

10. The card body according to claim 7, wherein the slot between the two main faces is formed in a wedge shape.

11. The card body according to claim 10, wherein one or two undercuts are provided in the region of a wedge tip of the slot.

12. A chip card, comprising a card body according to claim 7 and a chip module embedded at least partially in the module opening of the card body.

* * * * *